UNITED STATES PATENT OFFICE.

AUGUST BLANK AND WILHELM BERGDOLT, OF LEVERKUSEN, GERMANY, ASSIGNORS TO FARBENFABRIKEN VORM. FRIEDR. BAYER & CO., OF ELBERFELD, GERMANY, A CORPORATION OF GERMANY.

TRISAZO DYE.

971,112.      Specification of Letters Patent.    Patented Sept. 27, 1910.

No Drawing.      Application filed March 14, 1910. Serial No. 549,185.

*To all whom it may concern:*

Be it known that we, AUGUST BLANK and WILHELM BERGDOLT, citizens of the German Empire, residing at Leverkusen, Germany, have invented new and useful Improvements in Azo Dyes, of which the following is a specification.

The present invention relates to the manufacture and production of a new trisazo dyestuff. The process for its production consists in combining the diazo compound of meta-aminoformanilid with 2-amino-8-naphthol-6-sulfonic acid, eliminating the formyl radical from the product thus produced by saponification, tetrazotizing the resulting azo compound and combining the tetrazoazo compound thus produced with one molecule of meta-phenylenediamin and one molecule of the glycin of this compound. The new dye thus produced is after being dried and pulverized a dark powder soluble in water with a violet-brown color. It has a strong coloring power and its brown shades are fast to acids and alkalies. It can be further combined with diazo compounds and this combination can also be carried out on the fiber. The shades are in this manner materially deepened and rendered fast to washing.

In order to illustrate the new process more fully the following example is given, the parts being by weight:—13.6 parts of formyl-meta-phenylenediamin are diazotized with nitrite and HCl. The diazo compound is then introduced into an alkaline solution which has been prepared by dissolving 24 parts of 2-amino-8-naphthol-6-sulfonic acid in an aqueous solution of 36 parts of sodium carbonate. After the combination is complete the product of the reaction is heated to boiling. The formyl group is then eliminated from the resulting dye by heating the mixture for ½ to 1 hour to boiling with caustic soda lye (containing 35 parts of NaOH). Subsequently the excess of alkali is neutralized with hydrochloric acid, and the diamin thus obtained is after cooling with ice tetrazotized with 50 parts of hydrochloric acid (20° Bé.) and 15 parts of nitrite. The mixture is stirred for 4 hours and the tetrazo compound is then added to a cooled solution containing 11.8 parts of meta-phenylenediamin, 18 parts of the glycin of this compound and 30 parts of sodium carbonate. After about 1 hour the reaction is complete. The dye is filtered off and dried. It yields upon reduction with stannous chlorid and hydrochloric acid meta-phenylenediamin, triaminobenzene, diaminophenylglycin and 2.7-diamino-8-naphthol-6-sulfonic acid.

We claim:—

The herein described new trisazo dyestuff obtainable from formyl meta-phenylenediamin, 2-amino-8-naphthol-6-sulfonic acid, meta-phenylenediamin and the glycin of this compound, which is after being dried and pulverized a dark powder soluble in water with a violet-brown color, dyeing cotton brown shades fast to washing after being developed with diazotized para-nitranilin, and yielding upon reduction with stannous chlorid and hydrochloric acid meta-phenylenediamin, triaminobenzene, diaminophenylglycin and 2.7-diamino-8-naphthol-6-sulfonic acid, substantially as described.

In testimony whereof we have hereunto set our hands in the presence of two subscribing witnesses.

AUGUST BLANK. [L. S.]
    WILHELM BERGDOLT. [L. S.]

Witnesses:
    OTTO KÖNIG,
    CHAS. J. WRIGHT.